(12) United States Patent  (10) Patent No.: US 9,409,448 B2
Yoshikawa  (45) Date of Patent: Aug. 9, 2016

(54) PNEUMATIC TIRE

(71) Applicant: TOYO TIRE & RUBBER CO., LTD., Osaka-shi, Osaka (JP)

(72) Inventor: Makoto Yoshikawa, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 330 days.

(21) Appl. No.: 14/061,997

(22) Filed: Oct. 24, 2013

(65) Prior Publication Data

US 2014/0174612 A1 Jun. 26, 2014

(30) Foreign Application Priority Data

Dec. 25, 2012 (JP) .................................. 2012-281309

(51) Int. Cl.
 *B60C 1/00* (2006.01)
 *B60C 19/08* (2006.01)
 *B60C 9/00* (2006.01)

(52) U.S. Cl.
 CPC ............. *B60C 19/084* (2013.04); *B60C 19/082* (2013.04); *B60C 1/00* (2013.01); *B60C 9/00* (2013.01)

(58) Field of Classification Search
 CPC ............ B60C 1/00; B60C 9/00; B60C 19/00; B60C 19/08; B60C 19/082; B60C 19/084
 See application file for complete search history.

(56) References Cited

U.S. PATENT DOCUMENTS 3,240,250 A * 3/1966 Frazier ................... B29D 30/34
 152/560
2006/0102264 A1 5/2006 Nicolas
2007/0000585 A1 1/2007 Uchida et al.
2008/0308203 A1 12/2008 Kunisawa et al.
2013/0092300 A1 4/2013 Kunisawa et al.

FOREIGN PATENT DOCUMENTS

| EP | 2487052 | * | 8/2012 |
| JP | 10-6414 | * | 1/1998 |
| JP | 10-006414 A | | 1/1998 |
| JP | 10-193926 | * | 7/1998 |
| JP | 3615872 | * | 2/2005 |
| JP | 3681246 | * | 8/2005 |

(Continued)

OTHER PUBLICATIONS

Office Action dated Apr. 23, 2015, issued in counterpart German Patent Application No. 10 2013 113 935.3 with English translation (9 pages).

*Primary Examiner* — Justin Fischer (74) *Attorney, Agent, or Firm* — Westerman, Hattori, Daniels & Adrian, LLP (57) ABSTRACT

A pneumatic tire has a carcass ply and a side wall rubber provided in outer sides of the carcass ply. The carcass ply has joint portions obtained by overlapping end portions of ply members so as to join. At least one of the joint portions is provided with a rubber tape. The rubber tape is interposed between the end portions of the ply members and is exposed to a surface of the carcass ply. A topping rubber of the carcass ply and the side wall rubber are formed by a nonconductive rubber. The rubber tape is formed by a conductive rubber. A conductive route getting to the rubber tape from a ground-contacting surface is formed in a tread portion. A conductive route getting to the rubber tape from an outer surface of a bead portion is formed in the bead portion.

6 Claims, 5 Drawing Sheets

(56) References Cited

FOREIGN PATENT DOCUMENTS

| JP | 2006-143208 A | | 6/2006 |
|---|---|---|---|
| JP | 2007-008269 A | | 1/2007 |
| JP | 2009-006975 A | | 1/2009 |
| JP | 2009-023503 A | | 2/2009 |
| JP | 2012-192876 | * | 10/2012 |
| WO | WO 2009110353 | * | 9/2009 |

* cited by examiner

PNEUMATIC TIRE

BACKGROUND OF THE INVENTION

1. Field of the Invention

The present invention relates to a pneumatic tire which can discharge static electricity generated in a vehicle body or a tire to a road surface.

2. Description of the Related Art

In recent years, for the purpose of reducing a rolling resistance which is deeply involved with reduction of fuel consumption of a vehicle, there has been proposed that a constituting member of the tire is formed by a nonconductive rubber. For example, in the case that a tread rubber is formed by a nonconductive rubber which is highly blended with silica, it is possible to reduce the rolling resistance, and it is possible to obtain an effect of improving a braking performance on a wet road surface (a wet braking performance). In order to enhance the effect of reducing the rolling resistance, it is effective to form a topping rubber of a carcass ply and a side wall rubber with a nonconductive rubber.

In the tire using the nonconductive rubber as mentioned above, a conductive route is formed by using a conductive rubber for preventing a problem, for example, a radio noise and the like. In the case that the topping rubber of the carcass ply and the side wall rubber are formed by the nonconductive rubber, it is necessary to form the conductive route in a side portion of the tire like Patent Documents 1 to 4. Patent Document 5 discloses a carcass in which a rubber sheet is interposed in a joint portion, however, neither relate to a tire which uses the nonconductive rubber, nor suggest a method for forming the conductive route in the side portion of the tire.

PRIOR ART DOCUMENTS

Patent Document 1: Japanese Unexamined Patent Publication No. 2009-23503

Patent Document 2: Japanese Unexamined Patent Publication No. 2009-6975

Patent Document 3: Japanese Unexamined Patent Publication No. 2007-8269

Patent Document 4: Japanese Unexamined Patent Publication No. 2006-143208

Patent Document 5: Japanese Unexamined Patent Publication No. 10-6414

SUMMARY OF THE INVENTION

The present invention is made by taking the actual condition mentioned above into consideration, and an object of the present invention is to provide a pneumatic tire which can enhance an effect of reducing a rolling resistance by reducing a conductive rubber for forming a conductive route in a side portion of the tire.

The object can be achieved by the following present invention. The present invention provides a pneumatic tire comprising a pair of bead portions, side wall portions which extend to outer sides in a tire diametrical direction respectively from the bead portions, a tread portion which is connected to an outer end in the tire diametrical direction of each of the side wall portions, a carcass ply which gets to the bead portion from the tread portion via the side wall portion; and side wall rubbers which are provided in outer sides of the carcass ply in the side wall portions, wherein the carcass ply has joint portions obtained by overlapping end portions of ply members so as to join, at a plurality of positions in a tire circumferential direction, and at least one of the joint portions is provided with a rubber tape which is interposed between the end portions of the ply members and is exposed to a surface of the carcass ply, wherein a topping rubber of the carcass ply and the side wall rubber are formed by a nonconductive rubber, and the rubber tape is formed by a conductive rubber, and wherein a conductive route getting to the rubber tape from a ground-contacting surface which can come into contact with a road surface is formed in the tread portion, and a conductive route getting to the rubber tape from an outer surface of the bead portion which can come into contact with a rim is formed in the bead portion.

In this tire, the conductive route in the side portion of the tire is formed by the rubber tape which is provided in the joint portion of the carcass ply. The conductive route in the side portion of the tire is electrically conducted with the road surface via the conductive route which is formed in the tread portion, and is electrically conducted with the rim via the conductive route which is formed in the bead portion. Accordingly, it is possible to discharge the static electricity generated in the vehicle body and the tire onto a road surface through the conductive routes. Further, in comparison with the case that the topping rubber of the carcass ply and the side wall rubber are formed by the conductive rubber, it is possible to reduce the conductive rubber for forming the conductive route in the side portion of the tire, and it is possible to enhance the effect of reducing the rolling resistance.

It is preferable that the carcass ply has a main body portion which gets to the bead portion from the tread portion via the side wall portion, and a wound-up portion which is wound up to an outer side from an inner side in a tire width direction around a bead core which is buried in the bead portion, and wherein the conductive route formed in the tread portion is connected to the rubber tape which is exposed to the surface in the outer side in the tire diametrical direction of the main body portion, and the conductive route formed in the bead portion is connected to the rubber tape which is exposed to the surface in the outer side in the tire width direction or in the inner side in the tire diametrical direction of the wound-up portion. Accordingly, in the structure in which the carcass ply has the wound-up portion, it is possible to efficiently form the conductive route which gets to the bead portion from the tread portion.

It is preferable that the rubber tape is provided with an intermediate portion which is pinched by the end portions of the ply member, and extension portions which protrude out of the end portions of the ply member in the tire circumferential direction, and wherein a thickness of the rubber tape in the intermediate portion is smaller than a thickness of the rubber tape in the extension portion. According to the structure mentioned above, it is possible to well reduce the step of the carcass ply which is formed in the joint portion, and it is possible to inhibit the process defect, for example, an air intrusion.

In the above method, it is preferable that the extension portion is formed to be tapered toward a direction which comes away from the intermediate portion. According to the structure mentioned above, it is possible to well reduce the step of the carcass ply which is formed in the joint portion, and it is possible to effectively inhibit the process defect, for example, an air intrusion.

DETAILED DESCRIPTION OF THE PREFERRED EMBODIMENTS

An embodiment of the present invention will be explained with reference to the drawings.

Figure 1:
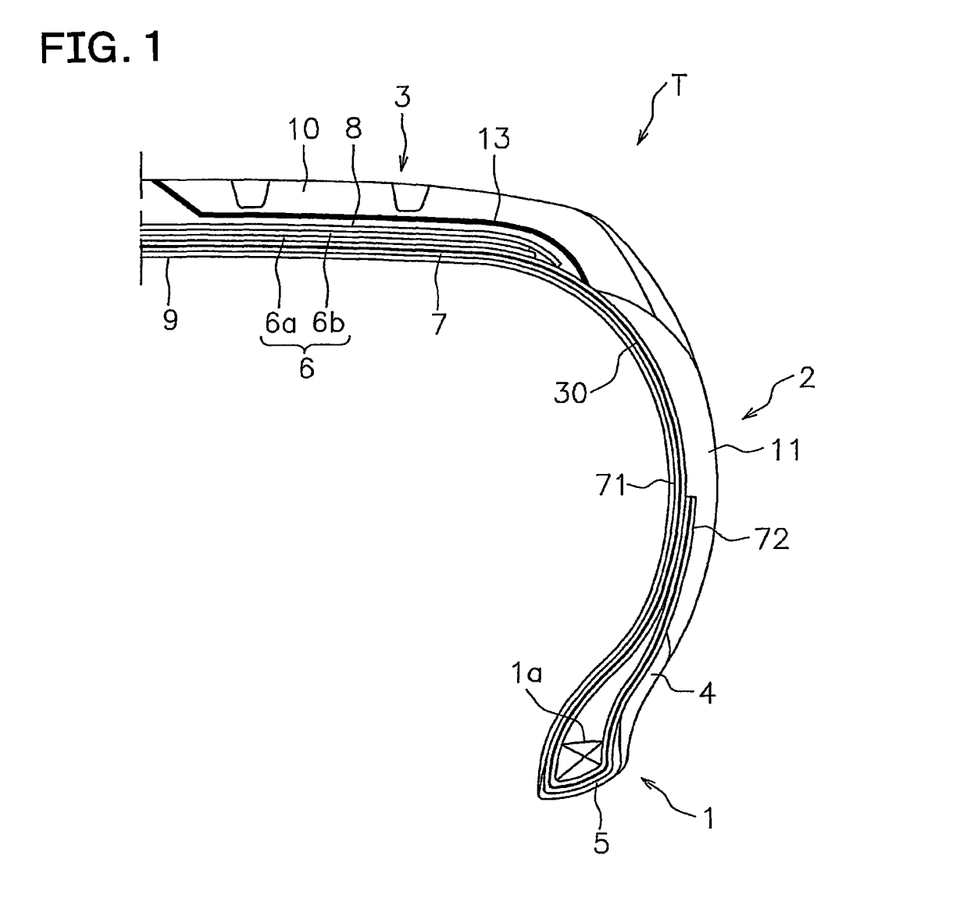
FIG. 1 is a half cross sectional view of a tire meridian showing an example of a pneumatic tire in accordance with the present invention.

A pneumatic tire T shown in FIG. 1 is provided with a pair of bead portions 1, side wall portions 2 which extend to outer sides in a tire diametrical direction from the respective bead portions 1, a tread portion 3 which is connected to outer ends in the tire diametrical direction of the respective side wall portions 2, carcass ply 7 which gets to the bead portion 1 from the tread portion 3 via the side wall portion 2, and side wall rubbers 11 which are provided in outer sides of the carcass ply 7 in the side wall portions 2. The bead portion 1 includes an annular bead core 1a composed of a bundle of steel wires or the like coated with rubber buried therein.

The carcass ply 7 is formed by coating carcass cords (refer to FIG. 3) extended and aligned in a direction which is approximately orthogonal to a tire circumferential direction with a topping rubber. A material of the carcass cord preferably employs an organic fiber, for example, a polyester, a rayon, a nylon and an aramid, and a metal, for example, a steel. In the present embodiment, the carcass ply 7 has a main body portion 71 which gets to the bead portion 1 from the tread portion 3 via the side wall portion 2, and a wound-up portion 72 which is wound up to an outer side from an inner side in a tire width direction around the bead core 1a. An inner liner rubber 9 for retaining a pneumatic pressure is provided in an inner side of the carcass ply 7.

The tread portion 3 is provided with a tread rubber 10 which constructs a ground-contacting surface, a belt 6 which comes into contact with the carcass ply 7 from an outer side in the tire diametrical direction, and a belt reinforcing member 8 which is laminated in the outer side in the tire diametrical direction of the belt 6. A conductive portion 13 is buried in the tread rubber 10. In FIG. 1, the conductive portion 13 is expressed by a thick line for making differentiation on the drawing easy. In the tire T, there is employed a tread-on-side structure in which an end portion of the tread rubber 10 is mounted to an end portion of the sidewall rubber 11, however, the structure is not limited to this.

The belt 6 is constructed by a plurality of (two in the present embodiment) belt plies 6a and 6b. The belt plies 6a and 6b are formed by coating the belt cords which are extended and aligned at an angle of incline, for example, about 20 degrees in relation to the tire circumferential direction with a topping rubber, and are laminated such that the belt cords intersect in reverse directions to each other between the plies. The belt reinforcing member 8 is formed by coating reinforcing cords which extends substantially in the tire circumferential direction with a topping rubber. The belt reinforcing member 8 can be omitted.

The bead portion 1 is provided with a rim strip rubber 4 which constructs a side surface of the bead portion 1, and a rubber chafer 5 which constructs a bottom surface of the bead portion 1. The side wall rubber 11 connected to the rim strip rubber 4 constructs a side surface of the side wall portion 2. The rim strip rubber 4 is positioned in an outer side in the tire width direction of the wound-up portion 72, and comes into contact with a rim flange of a rim when the tire is installed to the rim. The rubber chafer 5 is positioned in an inner side in the tire diametrical direction of the wound-up portion 72, and comes into contact with a bead sheet of the rim when the tire is installed to the rim.

Figure 2:
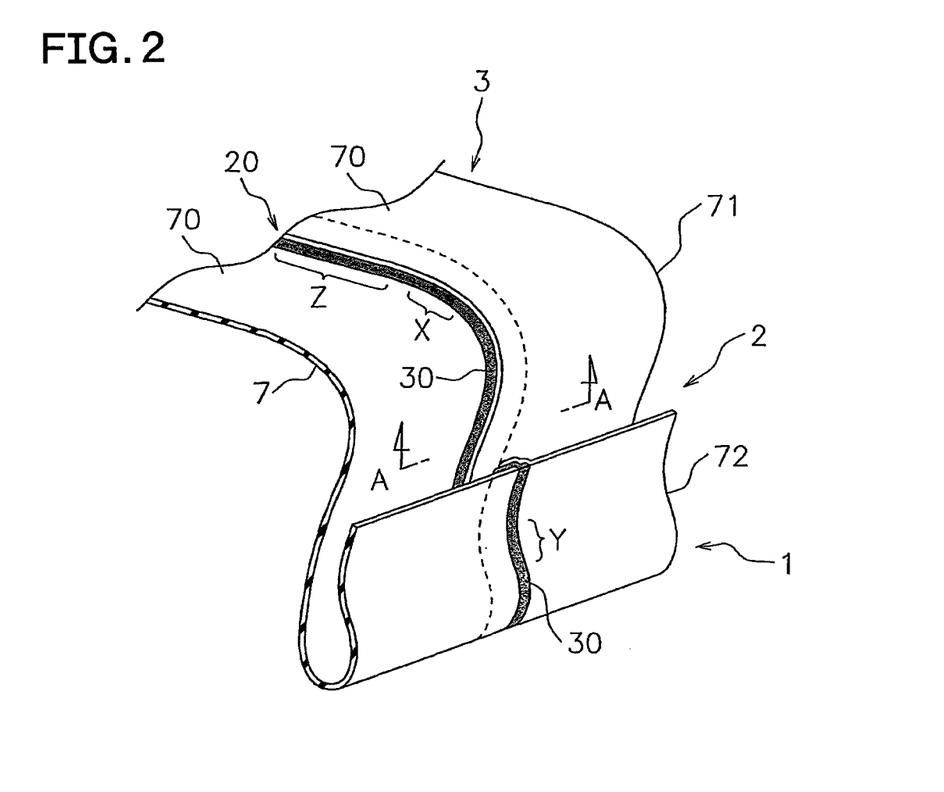
FIG. 2 is a perspective cross sectional view showing a substantial part of a carcass ply.

The carcass ply 7 has joint portions 20 obtained by overlapping the end portions of the ply members 70 so as to join as shown in FIG. 2 at a plurality of positions, for example, two to four positions in the tire circumferential direction. The joint portion 20 extends approximately in parallel to the carcass cord from one end to the other end of the carcass ply 7 in the tire width direction. As described blow, the joint portions 20 include the joint portions which are generated in a step before forming the tire, and the joint portion (s) which is generated in a tire forming step. The joint portion in which a rubber tape 30 mentioned later is provided may be constructed by any of the joint portions.

In the step before forming the tire, first of all, the ply member is formed by coating a lot of extended and aligned carcass cords with the topping rubber, and is cut at a magnitude corresponding to the tire width and so that the carcass cords are approximately orthogonal to the tire circumferential direction. Next, the ply member obtained by the cutting is joined in the tire circumferential direction (formation of the joint portion 20), and a single material having a length corresponding to a tire circumferential length or a long roll is manufactured. In the tire forming step, the single material or a single material obtained by taking from the roll and cutting at a desired length is wound around a forming drum and end portions thereof are joined to each other (formation of the joint portion 20). As a result, the annular carcass ply 7 is formed.

Figure 3:
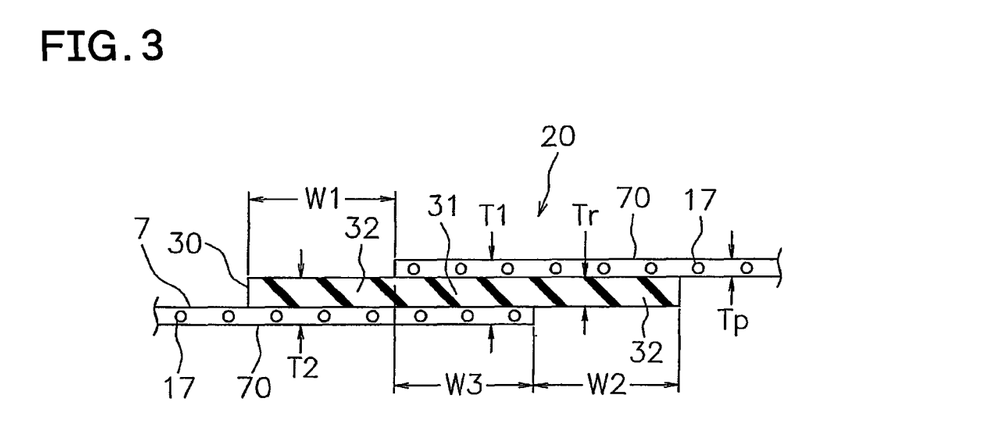
FIG. 3 is a cross sectional view as seen from an arrow A-A in FIG. 2.

At least one of the joint portions 20 is provided with the rubber tape 30 which is intervened between the end portions of the ply members 70 and is exposed to a surface of the carcass ply 7 as shown in FIGS. 2 and 3. In FIG. 2, the rubber tape 30 is colored with black for making differentiation on the drawing easy. In order to reduce a rolling resistance, the joint portion 20 provided with the rubber tape 30 is preferably provided at one position or two positions in the tire circumferential direction. The rubber tape 30 is pinched by end portions in the circumferential direction of a pair of ply members 70 which overlap each other, and is integrally joined with them.

In the tire T, the topping rubber of the carcass ply 7 and the side wall rubber 11 are formed by a nonconductive rubber, and the rubber tape 30 is formed by a conductive rubber. A conductive route getting to the rubber tape 30 from the ground-contacting surface which can come into contact with a road surface is formed in the tread portion 3, and a conductive route in a tire side portion formed by the rubber tape 30 can electrically conduct with the road surface via the conductive route. A conductive route getting to the rubber tape 30 from the side surface of the bead portion 1 which can come into contact with a rim (not shown) is formed in the bead portion 1, and the conductive route in the tire side portion formed by the rubber tape 30 can electrically conduct with the rim via the conductive route.

In the present embodiment, each of the tread rubber 10, the topping rubber of the belt 6 and the topping rubber of the belt reinforcing member 8 is formed by the nonconductive rubber, and the conductive portion 13 provided in the tread rubber 10 is formed by the conductive rubber. The conductive portion 13 continuously extends from one end which is exposed to the ground-contacting surface to the other end which gets to the rubber tape 30 as shown in FIG. 1, and the other end is connected to the rubber tape 30 (for example, an X area in FIG. 2) which is exposed to the surface in the outer side in the tire diametrical direction of the main body portion 71. As mentioned above, the conductive route formed in the tread portion 3 is constructed by the conductive portion 13.

Further, in the present embodiment, the rim strip rubber 4 is formed by the conductive rubber. The rim strip rubber 4 constructs the side surface of the bead portion 1 which comes into contact with the rim when the tire is installed to the rim, comes into contact with the carcass ply 7 from the outer side in the tire width direction as shown in FIG. 1, and is connected to the rubber tape 30 (for example, a Y area in FIG. 2) which is exposed to the surface in the outer side in the tire width direction of the wound-up portion 72. As mentioned above, the conductive route formed in the bead portion 1 is constructed by the rim strip rubber 4 itself.

A static electricity generated in the vehicle body is discharged from the rim via the conductive route of the bead portion 1 which is constructed by the rim strip rubber 4, the conductive route in the side portion of the tire which is constructed by the rubber tape 30, and the conductive route of the tread portion 3 which is constructed by the conductive portion 13. Since an amount of the conductive rubber for forming the conductive route in the side portion of the tire corresponds to an amount of the rubber tape 30, it is possible to enhance an effect of reducing the rolling resistance in comparison with the conventional one. The conductive route getting to the ground-contacting surface from the rim as mentioned above may be provided at least in one side in the tire width direction.

In the tire T, the conductive route is formed by the rubber tape 30 which constructs a part of the carcass ply 7. Accordingly, in comparison with the structure in which the conductive member corresponding to an independent member is interposed between the carcass ply 7 and the side wall rubber 11, it is possible to reduce a weight of the tire so as to reduce the rolling resistance, it is possible to improve a uniformity, and it is additionally possible to reduce unevenness appearing on the surface of the side wall portion 2 so as to improve an outer appearance. In addition, in the joint portion 20 provided with the rubber tape 30, since the adhesive bonding between the ply members 70 in which the carcass cords 17 are buried can be avoided, a durability is also improved.

The nonconductive rubber means a rubber in which an inherent resistance value is more than 8 MΩ·cm, and is manufactured, for example, by blending a raw material rubber with a silica as a reinforcing agent at a high rate. The silica is blended, for example, at 30 to 100 parts by weight in relation to 100 parts by weight of rubber component. As the silica, a wet type silica can be preferably employed, however, any material which is generally used as a reinforcing material can be used without limitation. The non-conductive rubber may be produced by blending a calcined clay, a hard clay, a calcium carbonate or the like in addition to the silica such as a precipitated silica, a silicic anhydride or the like.

Further, it is possible to employ a material which does not include any silica or is blended with the silica at a low rate as the reinforcing agent blended in the raw material rubber, and mainly includes a highly dispersed carbon black, for the non-conductive rubber. In the case that the topping rubber of the carcass ply 7 and the side wall rubber 11 are formed by the nonconductive rubber mentioned above, it is possible to enhance a rigidity of the side portion of the tire so as to achieve improvement of a steering stability while suppressing an increase of the rolling resistance.

The conductive rubber means a rubber in which an inherent resistance value is equal to or less than 8 MΩ·cm, and is manufactured, for example, by blending a raw material rubber with a carbon black as a reinforcing agent at a high rate. The carbon black is blended, for example, at 30 to 100 parts by weight in relation to 100 parts by weight of rubber component. The conductive rubber can be obtained by blending a known conductivity applying material such as a carbon including a carbon fiber, a graphite and the like, or a metal including a metal powder, a metal oxide, a metal flake, a metal fiber and the like other than the carbon black.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like. Further, the inherent resistance value mentioned above indicates a volume resistivity which is measured at 23° C. on the basis of JISK6271.

As shown in FIG. 3, the rubber tape 30 is provided with an intermediate portion 31 which is pinched by the end portions of the ply members 70, and extension portions 32 which protrude in the tire circumferential direction than the end portions of the ply members 70. The conductive routes formed in the tread portion 3 and the bead portion 1 are respectively connected to a pair of extension portions 32 which extend to both sides in the tire circumferential direction from the intermediate portion 31. In order to make the connection easy, lengths W1 and W2 of the extension portions 32 are preferably equal to or more than 5 mm, and more preferably go beyond 5 mm. Further, in order to reduce the rolling resistance, the lengths W1 and W2 are preferably equal to or less than 10 mm. An overlapping margin W3 of the ply members 70 is set, for example, between 5 and 10 mm.

In order to suppress an air intrusion in the forming the tire, a thickness T2 of the carcass ply 7 in the extension portion 32 is preferably equal to or less than a thickness T1 of the carcass ply 7 in the intermediate portion 31. In the present embodiment, since a thickness Tr of the rubber tape 30 is fixed, the thickness Tr and a thickness Tp of the ply member 70 satisfy a relationship of T1=Tr+2Tp, T2=Tr+Tp. The thickness Tr is, for example, between 0.3 and 1.0 mm, and the thickness Tp is, for example, between 0.9 and 1.5 mm. In FIG. 1, there is shown the carcass ply 7 which is cut at a position passing through the intermediate portion 31.

Figure 4:
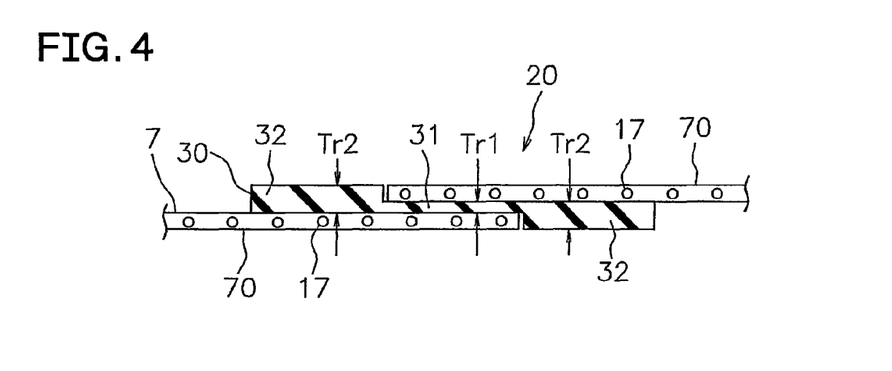
FIG. 4 is across sectional view showing a modified example of a rubber tape.

In a modified example shown in FIG. 4, a thickness Tr1 of the rubber tape 30 in the intermediate portion 31 is set to be smaller than a thickness Tr2 of the rubber tape 30 in the extension portion 32. As a result, it is possible to reduce a step of the carcass ply 7 which is formed in the joint portion 20 so as to inhibit the process defect, for example, the air intrusion, from being generated. In the structure mentioned above, the thickness Tr1 is set, for example, between 0.2 and 0.5 mm, and the thickness Tr2 is set, for example, between 0.5 and 1.0 mm.

In a modified example shown in FIG. 5(A), the thickness Tr1 is made smaller than the thickness Tr2, and the extension portion 32 is formed to be tapered toward a direction in which the extension portion comes away from the intermediate portion 31. According to the structure mentioned above, it is possible to well reduce the step of the carcass ply 7 which is formed in the joint portion 20 so as to effectively inhibit the process defect, for example, the air intrusion, from being generated. In the structure mentioned above, the thickness Tr1 is set as previously mentioned, the maximum value of the thickness Tr2 is set, for example, between 0.5 and 1.0 mm, and the minimum value of the thickness Tr2 is set, for example, between 0.1 and 0.3 mm.

In FIG. 5(A), the tapered extension portion 32 is previously formed integrally with the intermediate portion 31, however, the extension portion 32 is constructed separately from the intermediate portion 31 in FIG. 5(B). In other words, the rubber tape 30 in FIG. 5(B) is constructed by a member 31a which has a fixed thickness Tr1, and tapered members 32a which are later attached to both ends of the member 31a. In this case, it is easy to position the rubber tape 30 in relation to the joint portion 20 in the forming the tire, and it is possible to enhance a production efficiency. The later attaching structure mentioned above can be applied to a shape which is not tapered in the extension portion like FIGS. 3 and 4.

Figure 6:
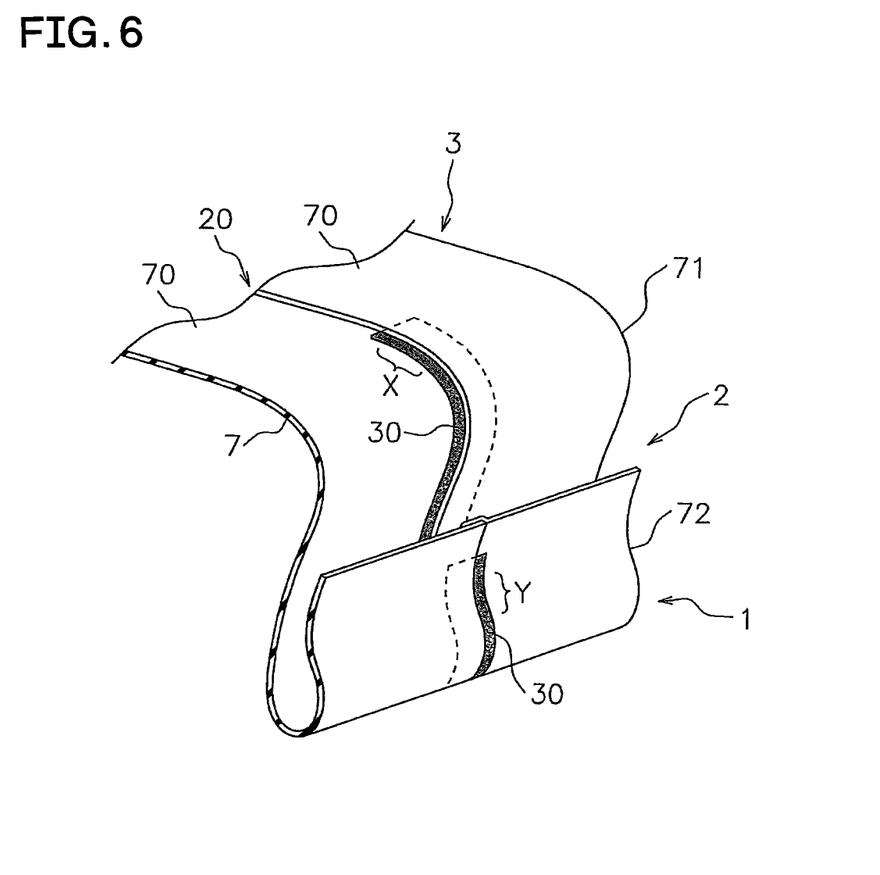
FIG. 6 is a perspective cross sectional view showing a modified example of an arrangement of a rubber tape.

The rubber tape 30 according to the present embodiment is provided from one end of the carcass ply 7 to the other end, and extends over a whole length of the joint portion 20, however, is not limited to this structure as long as the rubber tape is provided at a position which is necessary for forming the conductive route. For example, like the rubber tape 30 shown in FIG. 6, the rubber tape may be segmentalized by the tread portion 3, or may not reach the end portion of the carcass ply 7.

As long as the conductive route in the side portion of the tire can be electrically conductive with the road surface, the shape of the conductive route formed in the tread portion 3 is not particularly limited. For example, there may be provided a conductive portion in which one end is exposed to the ground-contacting surface, and the other end is exposed to the bottom surface of the tread rubber 10 and is connected to the belt reinforcing member 8. In this case, the conductive route getting to the rubber tape 30 from the ground-contacting surface can be constructed by forming the topping rubber in each of the belt reinforcing member 8 and the belt 6 by the conductive rubber, and bringing the belt 6 into contact with the rubber tape 30 (for example, a Z area in FIG. 2) which is exposed to the surface of the carcass ply 7.

As long as the conductive route in the side portion of the tire can be electrically conductive with the rim, the shape of the conductive route formed in the bead portion 1 is not particularly limited. For example, the rim strip rubber 4 may be formed by the nonconductive rubber, and the conductive portion formed by the conductive rubber may be buried in an inner portion thereof. In this case, the conductive route getting to the rubber tape 30 from the side surface of the bead portion 1 can be constructed by connecting one end of the conductive portion to the rubber tape 30 (for example, the Y area in FIG. 2) which is exposed to the surface of the carcass ply 7, and exposing the other end of the conductive portion to the side surface of the bead portion 1 which can come into contact with the rim.

The outer surface of the bead portion 1 which can come into contact with the rim includes not only the side surface of the bead portion 1, but also the bottom surface of the bead portion 1 which comes into contact with the bead sheet of the rim when the tire is installed to the rim. Therefore, the conductive route formed in the bead portion 1 may be structured such as to reach the rubber tape 30 from the bottom surface of the bead portion 1. In this case, the rubber chafer 5 formed by the conductive rubber or the conductive portion embedded in the rubber chafer 5 formed by the nonconductive rubber is connected to the rubber tape 30 which is exposed to the surface in the inner side in the tire diametrical direction of the wound-up portion 72. The rim strip rubber 4 may be formed by the nonconductive rubber.

In the embodiment mentioned above, there is shown the example in which one carcass ply 7 is provided, however, a plurality of (for example, two) carcass plies may be provided. In this case, the conductive route can be secured by arranging both the joint portions adjacently in the thickness direction of the carcass ply between the mutually overlapping carcass plies, and bringing the rubber tapes into contact with each other. Alternatively, the topping rubber may be formed by the conductive rubber, in the partial carcass plies.

Figure 7:
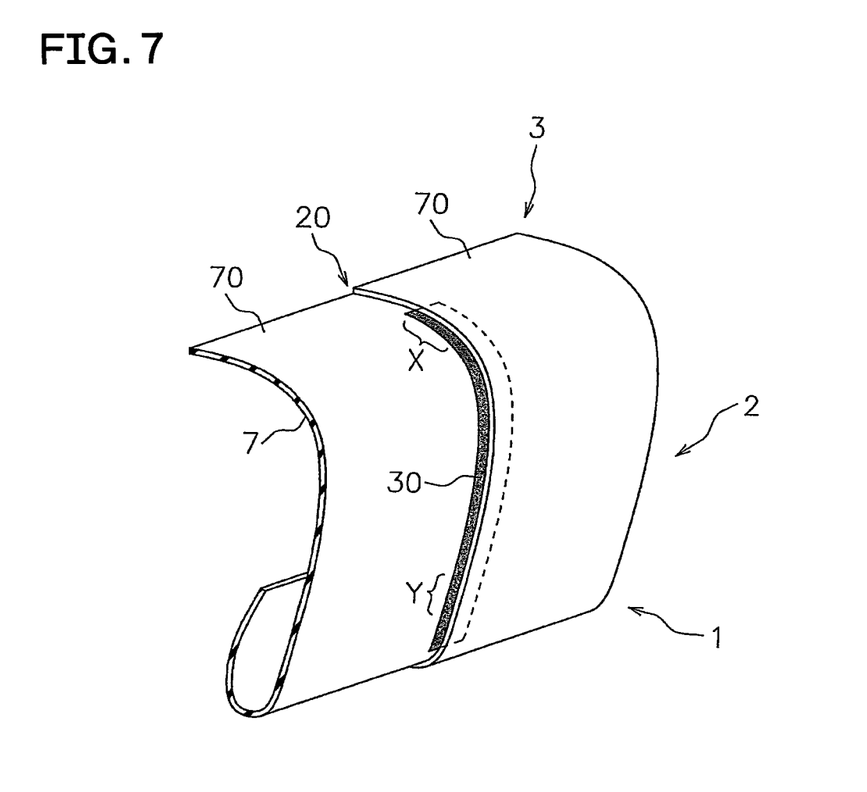
FIG. 7 is a perspective cross sectional view showing a modified example of a carcass ply.

The carcass ply 7 is not limited to the structure having the wound-up portion, but may be structured, as exemplified in FIG. 7, such that an end portion is wound up inward. The conductive route formed in the tread portion 3 and the conductive route formed in the bead portion 1 are connected to the rubber tape 30 provided in the joint portion 20, in the same manner as the embodiment mentioned above. The rubber tape 30 in this case may be exposed only to a surface which comes to an outer peripheral side of the carcass ply 7. The carcass ply 7 is separated in the tire width direction at the tread portion 3, and has separated end portions which are separated from each other, in the tread portion 3.

The present invention is not limited to the embodiment mentioned above, but can be improved and modified variously within the scope of the present invention.

EXAMPLES

An example which concretely shows the structure and effect of the present invention will be explained. An evaluation of each of performances is executed as follows.

(1) Rolling Resistance

A rolling resistance of the tire was measured according to a drum traveling test which uses a rolling resistance tester. A result of a comparative example 1 is set to 100, and the rolling resistance is evaluated by an index number. The smaller numerical value indicates the lower rolling resistance.

(2) Uniformity

Based on a test method defined in JISD4233, RFV (radial force variation) was measured, and uniformity of a tire was evaluated. Specifically, there was measured an amount of fluctuation of a reaction force in a radial direction which is generated by pressing the tire against a rotary drum under a predetermined load, and rotating the tire while keeping a distance between both shafts constant, and an inverse number thereof was calculated. A result of the comparative example 1 is set to 100 and the uniformity is evaluated by an index number. The greater numerical value indicates the smaller amount of fluctuation, that is, the more excellent uniformity.

(3) Air Intrusion Defect

In relation to the tire number (about 1,000) to which a cure process is applied, a rate of the tire number in which the air intrusion defect is generated was searched. A result of the comparative example 1 is set to 100, and the air intrusion defect is evaluated by an index number. The smaller numerical value indicates the more suppression of the generation of the air intrusion defect.

The size of the tire provided for evaluation is 195/65R15, and the tire structures and the rubber compositions in each of the examples are in common except the structure relating to the conductive route in the side portion of the tire. In the comparative example 1, a rubber sheet getting to the bead portion from the tread portion via the side wall portion is arranged as a separate member, and the rubber sheet is interposed between the carcass ply and the side wall rubber, and between the carcass ply and the rim strip rubber. In Table 1, the thicknesses Tr2 of the rubber sheet in working examples 3 and 4 are both the maximum values.

TABLE 1

Figure 5:
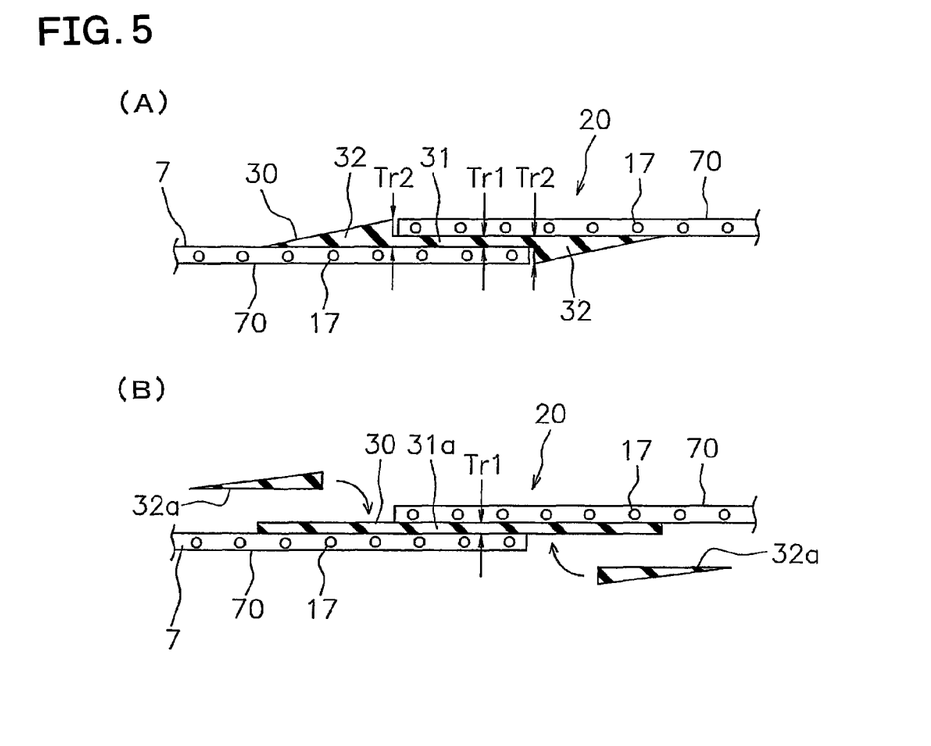
FIG. 5 is across sectional view showing a modified example of a rubber tape.

| | comparative example 1 | working example 1 | working example 2 | working example 3 | working example 4 |
|---|---|---|---|---|---|
| structure | separate member arranged | FIG. 3 | FIG. 4 | FIG. 5 (A) | FIG. 5 (B) |
| thickness of carcass ply | 1.2 mm | Tp: 1.2 mm | Tp: 1.2 mm | Tp: 1.2 mm | Tp: 1.2 mm |
| thickness of rubber sheet | 0.5 mm | Tr: 0.5 mm | Tr1: 0.3 mm Tr2: 0.5 mm | Tr1: 0.3 mm Tr2: 0.5 mm | Tr1: 0.3 mm Tr2: 0.5 mm |
| Rolling Resistance | 100 | 99 | 97 | 96 | 96 |
| Uniformity | 100 | 101 | 102 | 103 | 103 |
| Air Intrusion Defect | 100 | 98 | 97 | 95 | 95 |

As shown in Table 1, the working examples 1 to 4 result in a lower rolling resistance than the comparative example 1. This result is thought to be caused by the fact that the conductive rubber for forming the conductive route in the side portion of the tire is relatively less. Further, in the working examples 2 to 4, the rolling resistance is lower than the working example 1, the uniformity is improved, and the generation of the air intrusion defect is suppressed.

What is claimed is:

1. A pneumatic tire comprising:
   a pair of bead portions;
   side wall portions which extend to outer sides in a tire diametrical direction respectively from the bead portions;
   a tread portion which is connected to an outer end in the tire diametrical direction of each of the side wall portions;
   a carcass ply which gets to the bead portion from the tread portion via the side wall portion; and
   side wall rubbers which are provided in outer sides of the carcass ply in the side wall portions,
   wherein the carcass ply has joint portions obtained by overlapping end portions of ply members so as to join, at a plurality of positions in a tire circumferential direction, and at least one of the joint portions is provided with a rubber tape which is interposed between the end portions of the ply members and is exposed to a surface of the carcass ply,
   wherein a topping rubber of the carcass ply and the side wall rubber are formed by a nonconductive rubber, and the rubber tape is formed by a conductive rubber, and
   wherein a conductive route is formed from a ground-contacting surface by a conductive portion in the tread portion which can come into contact with a road surface to an outer surface of the bead portion constructed by a rim strip rubber in the bead portion which can come into contact with a rim via the rubber tape in at least one of the side wall portions.

2. The pneumatic tire according to claim 1, wherein the carcass ply has a main body portion which gets to the bead portion from the tread portion via the side wall portion, and a wound-up portion which is wound up to an outer side from an inner side in a tire width direction around a bead core which is buried in the bead portion, and
   wherein the conductive route formed in the tread portion is connected to the rubber tape which is exposed to the surface in the outer side in the tire diametrical direction of the main body portion, and the conductive route formed in the bead portion is connected to the rubber tape which is exposed to the surface in the outer side in the tire width direction or in the inner side in the tire diametrical direction of the wound-up portion.

3. The pneumatic tire according to claim 1, wherein the rubber tape is provided with an intermediate portion which is pinched by the end portions of the ply member, and extension portions which protrude out of the end portions of the ply member in the tire circumferential direction, and wherein a thickness of the rubber tape in the intermediate portion is smaller than a thickness of the rubber tape in the extension portion.

4. The pneumatic tire according to claim 3, wherein the extension portion is formed to be tapered toward a direction which comes away from the intermediate portion.

5. The pneumatic tire according to claim 1, wherein the conductive portion is provided in a tread rubber of the tread portion and is formed by a conductive rubber.

6. The pneumatic tire according to claim 5, wherein the conductive portion continuously extends from first end which is exposed to the ground-contacting surface to second end which contacts the rubber tape.

* * * * *